United States Patent [19]

Reichardt et al.

[11] Patent Number: 4,799,891
[45] Date of Patent: Jan. 24, 1989

[54] DUAL-CONTACTING APPARATUS FOR CHIP-CARDS

[75] Inventors: Manfred Reichardt, Weinsberg; Eberhard Raab, Untereisesheim, both of Fed. Rep. of Germany

[73] Assignee: Amphenol Corporation, Wallingford, Conn.

[21] Appl. No.: 48,170

[22] Filed: May 11, 1987

[30] Foreign Application Priority Data

May 30, 1986 [DE] Fed. Rep. of Germany ....... 3618091

[51] Int. Cl.⁴ ............................................ H01R 29/00
[52] U.S. Cl. ........................................ 439/43; 439/52; 439/64; 439/67; 439/260
[58] Field of Search .............. 439/43, 44, 49, 50, 439/52, 53, 65, 67, 74, 441, 492, 493, 391, 393, 152, 260, 267

[56] References Cited

U.S. PATENT DOCUMENTS

| | | | |
|---|---|---|---|
| 4,270,826 | 6/1981 | Narozny | 439/52 |
| 4,449,775 | 5/1984 | de Pommery et al. | 439/373 |
| 4,652,976 | 3/1987 | Fushimoto | 439/64 |
| 4,735,578 | 4/1988 | Reichardt et al. | 439/152 |

FOREIGN PATENT DOCUMENTS

| | | |
|---|---|---|
| 0167356 | 6/1985 | European Pat. Off. . |
| 2361129 | 6/1975 | Fed. Rep. of Germany . |
| 2637139 | 2/1977 | Fed. Rep. of Germany . |
| 2632776 | 2/1977 | Fed. Rep. of Germany . |
| 2613406 | 10/1977 | Fed. Rep. of Germany . |
| 3235654 | 3/1984 | Fed. Rep. of Germany . |
| 3433316 | 4/1985 | Fed. Rep. of Germany . |
| 3443397 | 5/1986 | Fed. Rep. of Germany . |

*Primary Examiner*—Gil Weidenfeld
*Assistant Examiner*—Paula A. Austin
*Attorney, Agent, or Firm*—Bacon & Thomas

[57] ABSTRACT

This invention provides a dual contacting apparatus for a chip-card and a contact set therefor, for use with chip-cards on which the contacts are located at different locations. A flat cable (24) is arranged in a manner such that it provides for a series or parallel connection of the insulation displacement contacts of the contact elements of the contact set to contact one type of card and the contact elements are adapted to contact the other type of card.

21 Claims, 4 Drawing Sheets

DUAL-CONTACTING APPARATUS FOR CHIP-CARDS

BACKGROUND OF THE INVENTION

1. Field of the Invention

The invention relates to a contacting apparatus for chip-cards of different types, i.e., chip-cards with contacts being arranged in different arrays and locations on the card.

2. Description of the Prior Art

A contacting apparatus for a chip-card is already known wherein a set of contact elements is used which comprises a plurality of contact elements, so as to provide for a contact or termination with the card contacts which are placed on the upper surface of a chip-card. Each of the contact elements of the set of contact elements comprises one end which is adapted for contacting one of the card contacts. The other end of each of said contact elements of the set of contact elements is used for providing the connection to an electronic card processing means for processing the data stored in the chip-card. It is known to either move the card towards the contact elements of the set of contact elements, so as to provide the desired contacting operation, or else it is also possible to move the contact elements towards the card, so as to provide the contacting operation with the card contacts.

Specifically, reference is made to the prior art as represented by U.S. Pat. No. 4,449,775, and German applications Nos. 32 35 654 and 34 33 316.

As it turns out, different types of chip-cards are used in practice. For the standard chip-card presently used in France, the card contacts are located at a different location on the upper surface of the card compared with the location of the card contacts of a standard chip-card presently used in Germany. The known contact apparatus can be used only for one type of chip-card.

It would be desirable to provide a contacting apparatus for chip-cards such that it may be used in connection with chip-cards of different types.

It would also be desirable to provide a chip-card contacting apparatus which can be used for two types of chip-cards, specifically for chip-cards of the French standard card type and for chip-cards of the German standard card type.

A contacting apparatus which is useful for two types of chip-cards may be referred to as a dual-contacting apparatus.

SUMMARY OF THE INVENTION

In accordance with this invention, there is provided a dual-contacting apparatus for contacting selectively the card contacts of a chip-card of a first type or, alternatively, with the card contacts of a chip-card of a second type, the apparatus having a set of contact elements which comprises:
  insulating body means,
  a plurality of contact elements supported by the insulating body means, wherein the contact elements form a first group of contact elements which are adapted for contacting the card contacts of the chip-cards of the first type, and wherein further the contact elements form a second group of contact elements which serve for contacting the card contacts of the chip-card of the second type,
  means for connecting the contact elements with an electronic card processing means, wherein each contact element comprises a termination member adapted for contacting one of the card contacts, and
  means for coupling corresponding ones of the contact elements of the first and second groups, such that the connecting means is either connected only to the termination members of the contact elements of the first group or only to the contact elements of the second group.

Also in accordance with this invention, there is provided a set of contact elements for a dual-contacting apparatus for selectively contacting the card contacts of a chip-card of a first type or for contacting the card contacts of a chip-card of a second type, the set of contact elements comprising:
  insulating body means,
  a plurality of contact elements supported in the insulating body means, wherein the contact elements form a first group of contact elements adapted for contacting the card contacts of the chip-card of the first type and wherein the contact elements adapted for contacting the card contacts of the chip-card of the second type,
  means for connecting the contact elements with an electronic card processing means, wherein each contact element comprises a termination member for connection with the card processing means and a contact member for contacting a card contact, and
  means for coupling appropriate contact elements of the first and second groups in such a manner that the connecting means is either connected only with the termination members of the contact elements of the first group or only with the termination members of the contact elements of the second group.

Preferably, the termination members of the first and second group of contact elements are in the form of insulation displacement contacts and the coupling means comprises a flat cable. The cable may be folded to provide the necessary connections.

The invention provides two possibilities for achieving the above objects.

In accordance with a first possibility for each of the eight card contacts provided on the French as well as on the German card, a flat cable having 16 leads or wires is used, i.e., all card contacts are individually contacted and have a respective wire assigned thereto. At the free end of the cable, i.e. the end of the cable which leads to the electronic card processing means, the information is supplied in parallel.

It is also possible to use instead of one flat cable having 16 wires, two cables each having 8 wires. Moreover, it is possible to use a cable with more or less wires depending on the number of card contacts to be contacted.

It is conceivable provide additional contact elements in the set of contact elements. Such additional contact elements are used for special purposes, for instance for providing a display indicating that the end or reading position is reached by the chip-card in the contacting apparatus.

Besides providing a parallel arrangement of the card contacts another possibility provided by the invention is a so-called series arrangement of the card contacts. Assuming again that each chip-card comprises 8 card contacts, it will now be sufficient to use just one flat cable having 8 wires. The 8 wire flat cable will first provide the termination for a first group of card contacts, i.e. a group consisting all card contacts of the card of a first type (for instance the French card). Thereupon, the 8 wire flat cable is twice folded in such a manner that now a second group of card contacts may be terminated. The second group of card contacts comprises all card contacts of the card of the second type (for instance the German card). The folding occurs in such a manner that each card contact of the first group which corresponds to an appropriate card contact of the second group is connected with each other by the same wire of the flat cable.

In accordance with a preferred embodiment of the invention the double-folding occurs with an angle of 45°, so that a triangular area is formed within which the flat cable is bonded to each other by means of an adhesive, so that an arrangement is obtained which requires little space.

DESCRIPTION OF THE PREFERRED EMBODIMENTS

In connection with FIGS. 1 and 2 two different types of chip-cards will be described. Thereupon, a contacting apparatus shown in FIGS. 3 to 5 will be discussed, the contacting apparatus being adapted to provide contact with chip-cards of different types, specifically chip-cards of the type shown in FIGS. 1 and 2. The connection between the contacting apparatus, and consequently the connection with the card contacts provided on the chip-cards, for instance with an electronic card processing means is preferably provided by means of a flat cable. A preferred means of termination for the flat cable will be discussed in some detail in connection with FIGS. 7 and 8.

Figure 1:
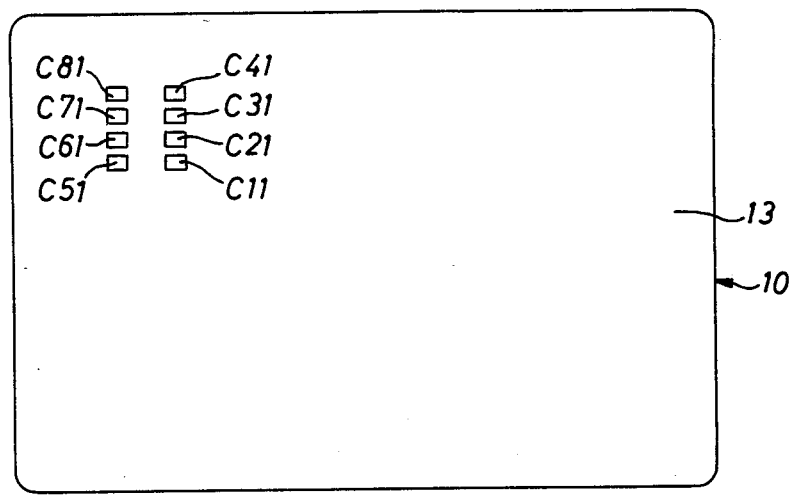
FIG. 1 is a plan fiew of a first type of a chip-card.

FIG. 1 discloses a chip-card 10 of a first type. Inasmuch as such a chip-card is frequently used in France, it will be referred to simply as "French card". The French card 10 comprises at its upper surface 13 an array of card contacts comprising two vertical rows with card contacts C11, C21, C31, C41 (right row) and C51, C61, C71 and C81 (left row). The card contacts on the French card will be referred to as the "French card contacts".

Figure 2:
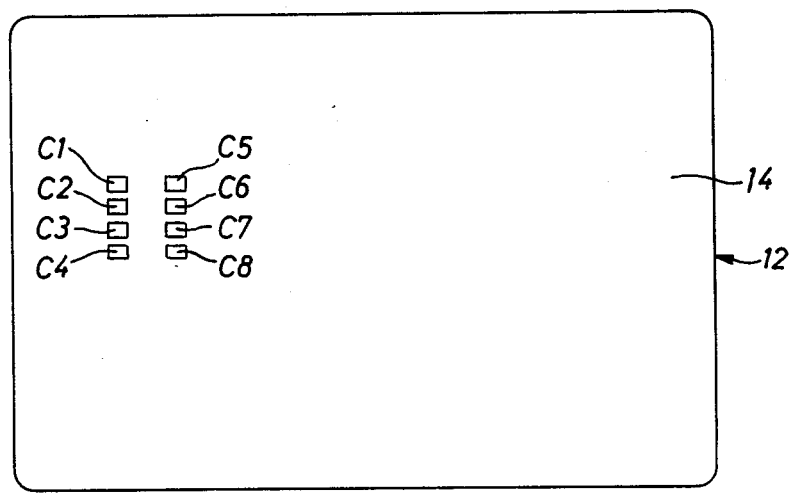
FIG. 2 is a plan view of a second type of a chip-card.

FIG. 2 discloses a chip-card 12 of a second type which is frequently used in Germany. The chip-card will be referred to as the "German card". The German card 12 carries at its upper surface 14 eight (German) card contacts, i.e. C8, C7, C6, C5 (right row) and C4, C3, C2, C1 (left row). If one contemplates an arrangement of the French and German cards above each other, all card contacts of the two cards would define an arrangement which will be called a termination image and which will be discussed later in connection with FIGS. 7 and 8.

Figure 3:
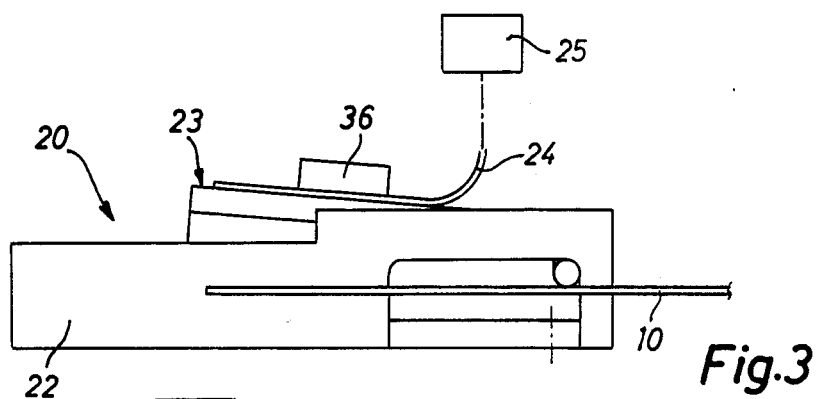
FIG. 3 is a schematic side-elevational view of a contacting apparatus for chip-cards of the two types with the contacting apparatus being shown in its insert and output position for the chip-card.
Figure 4:
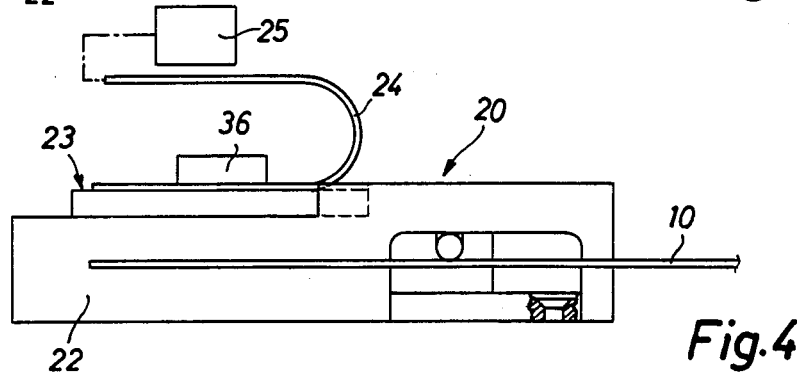
FIG. 4 is a view similar to FIG. 3 with the contacting apparatus and the chip-card being in the reading position.
Figure 5:
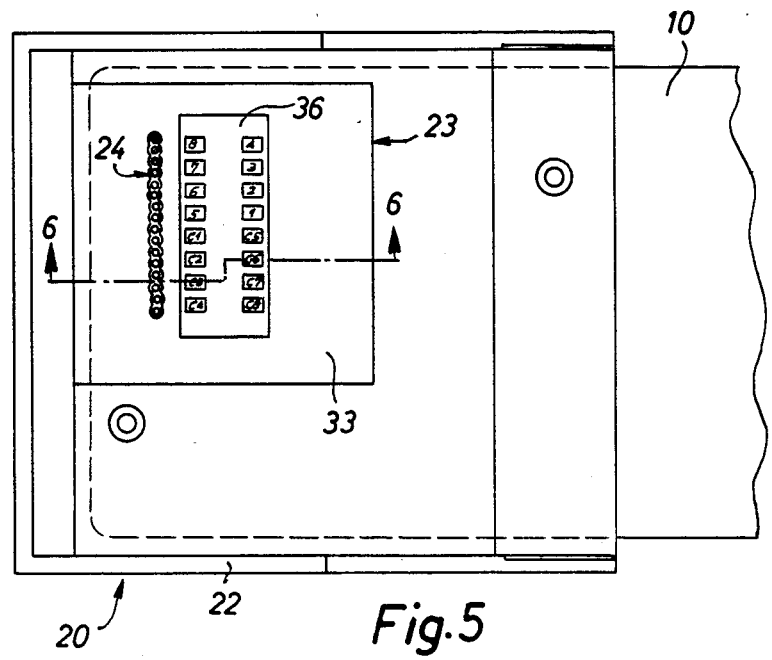
FIG. 5 is a schematic plan view of the contacting apparatus of FIG. 4 with the flat cable being shown in a schematic representation.

A dual-contacting apparatus 20 is shown in FIGS. 3-5 as comprising a housing 22. The dual-contacting apparatus 20 can be used either for contacting (or terminating) a French card 10 or a German card 12. FIG. 3 discloses the insertion of a French card 10 into the contacting apparatus 20. A set 23 of contact elements which has to be connected with the card contacts is in its rest position . FIG. 4 shows the dual-contacting apparatus 20 with the French card 10 being completely inserted. The card 10 is now in its reading position. Also, the set 23 of contact elements is now in its contacting or termination position, a condition which is shown in detail in FIG. 6. In the contacting position the card contacts are connected by means of a flat cable 24 with an electronic card processing means 25, i.e., a means for processing the data received from the card.

In FIGS. 3-6 a pressure member is referred to by reference numeral 36 and serves for the termination of the flat cable 24 with insulation displacement means described below.

Reference is now made to the extremely schematic plan view of FIG. 5. In FIG. 5 the flat cable 24 is only shown in a sectional representation, i.e., not in the manner as was shown in FIGS. 3 and 4. Morever, FIG. 5 permits viewing through the pressure member 36. The location of the French as well as of the German card contacts can be realized in this position of a French and German card, respectively. It should be noted that always either one type or the other type is inserted into the dual-contacting apparatus. As can be recognized, the distance or pitch between the card-contacts is the same for the German as well as for the French card contacts.

Figure 6:
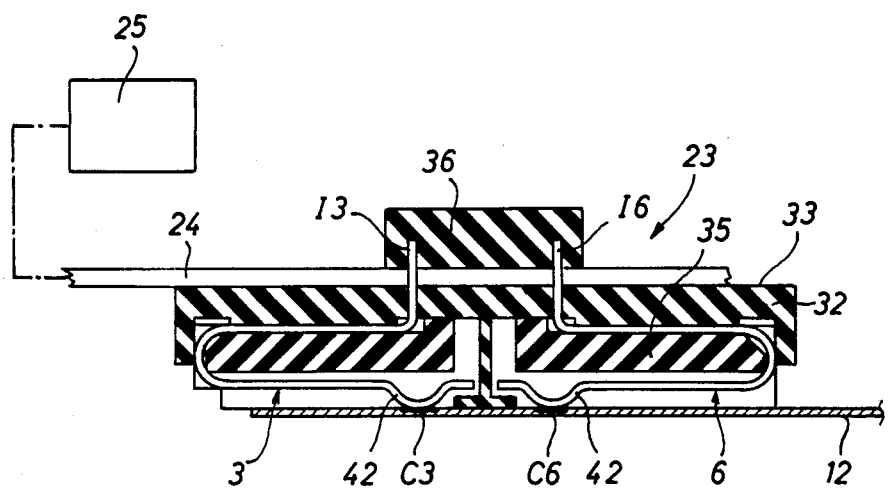
FIG. 6 is a partial sectional view along line 6 in FIG. 5.

FIG. 6 discloses in a schematic manner the set 23 of contact elements of the invention. The set 23 of contact elements comprises a holding member 32, on the upper surface 33 of which the flat cable 24 may be arranged. An insulating body 35 supports a plurality of contact elements, two of which are shown in FIG. 6, i.e., contact elements 3 and 6. In accordance with this invention for each card contact one contact element may be provided. It is also possible to provide additional contact elements, for example if different functions are envisaged. For instance, one of such additional contact elements may be used as a "card end switch", i.e. a switch which indicates that the chip-card has reached its end or fully inserted position.

FIG. 6 also discloses that each contact element 3, 6 is provided with an appropriate insulation displacement means I3, I6. In this way a connection can be provided to a flat cable 24 in a simple manner. In FIG. 6 a German card 12 is shown in its reading position in which the contact element 3 contacts a card contact C3 and contact element 6 contacts a card contact C6.

The use of a flat cable 24 together with insulation displacement means I3, I6 for all the contact elements 3, 6 is advantageous inasmuch as the means for connecting the contact elements of the set of contact elements with the electronic card processing means 25 is simplified.

Figure 7:
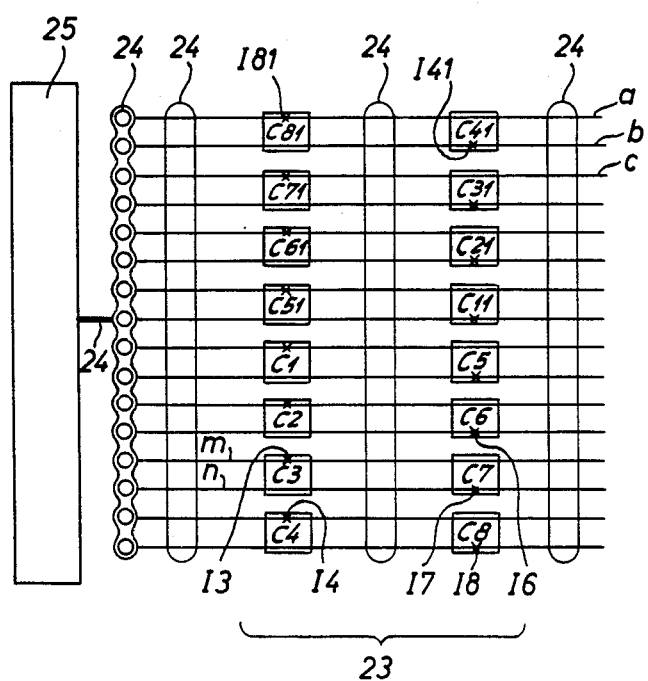
FIG. 7 represents a first principal possibility for the termination of the chip-card contacts of a chip-card of the first and of the second type.

FIG. 7 shows in an extremely schematic manner the above-mentioned first possibility according to which the French card contacts C11, C21 and so on and the German card contacts C1, C2 and so on are connected via the flat cable 24 having 16 wires with the electronic card processing means 25.

Inasmuch as FIG. 7 is only a schematic representation, it should be considered in connection with FIG. 6, with the following comments being kept in mind. The flat cable 24 is shown initially as a heavy line and is shown then in a sectional view. Thereupon, on the right-hand side the flat cable 24 is represented by lines representing the wires of the flat cable. Three of such wires are referred to by a, b, and c. The elliptic enclosures of the lines representing wires are supposed to indicate that the flat cable extends first to the first or left French/German row of card contacts and thereupon to the second (or right) French/German row of card contacts. Thereupon the flat cable ends to the right of the second row of card contacts.

It can be recognized that one wire of the flat cable 24 is assigned to each individual card contact. Thus, the card contacts are lead out of the set 23 of contact elements in a parallel manner.

It should be emphasized that each one contact element is assigned to each one card contact (see FIG. 6), and that each of the contact elements comprises an insulation displacement means. The insulation displacement means is shown in FIG. 7 (and also in FIG. 8) and is each represented by a small cross. This means, at the location of the cross one wire of the flat cable 24 is connected with the corresponding contact element, and the contact element, in turn, can contact the card contact.

For instance, insulation displacement means I3 is assigned tot he card contact C3, and the insulation displacement means I3 connects the wire "m" with the contact element 3. The wire "n" by-passes the insulation displacement means I3 and is only connected to an insulation displacement means I7. The insulation displacement means I7 is povided for and mounted to a contact element not shown (such contact element might be referred to for instance with reference numeral 7) and is adapted for contacting the card contact C7.

In FIG. 7 some additional insulation displacement means are shown, i.e., the insulation displacement means I81, I41, and I6. Similar comments will be true for all card contacts and the corresponding contact elements of the set of contact elements, and also for the insulation displacement means of the contact elements.

Figure 8:
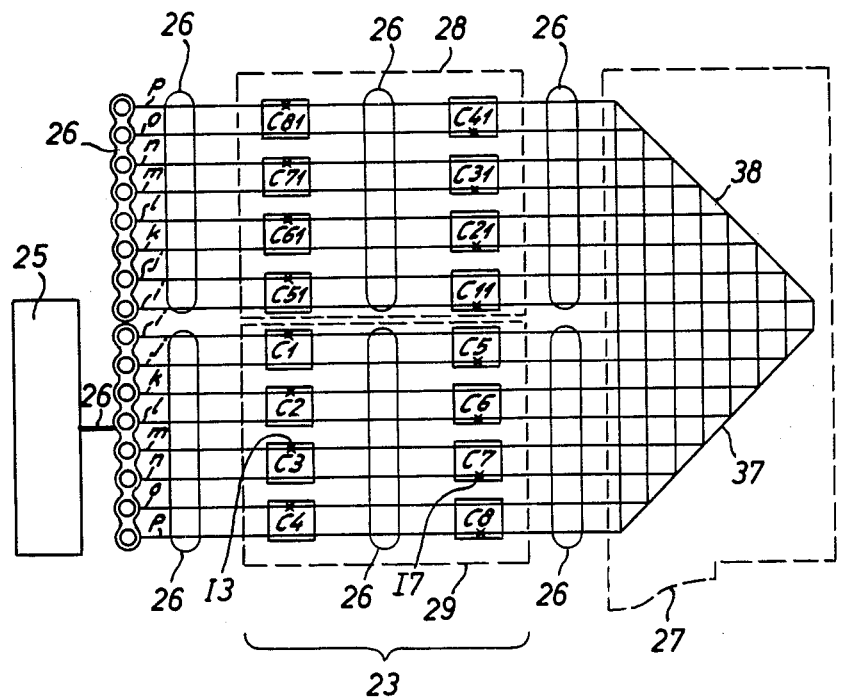
FIG. 8 is a second principal possibility for the termination of the contacts of chip-cards of the first and second type.

FIG. 8 shows in a schematic representation similar to FIG. 7 the above-mentioned second possibility for providing a connection between the contact elements and the electronic card processing means 25. According to FIG. 8 a flat cable 26 is used which comprises only half the number of wires compared with the flat cable used in the embodiment of FIG. 7. Specifically, a flat cable 26 having 8 wires is used. This flat cable 26 extends from the electronic card processing means 25, or any other suitable apparatus, to the set 23 of contact elements. The set 23 of contact elements shown in FIG. 8 is of the same design as the set of contact elements shown in FIG. 7. Thus, to each French card contact as well as each German card contact an appropriate "French" and "German" contact element is assigned, having an appropriate French and German insulation displacement means. Moreover, a French group 28 of contact elements and a German group 29 of contact elements is formed. Insofar attention is drawn to the reference numerals of FIG. 7. For instance, the German card contact C3 comprises a corresponding German contact element 3 (see FIG. 6), which in turn comprises a German insulation displacement means I3. The insulation displacement means I3 connects the wire "m" with the contact element 3. The wire "n" by-passes the insulation displacement means I3, i.e. does not contact the insulation displacement means I3 which belongs to the contact element which corresponds to card contact C3.

Between the French card contacts and the German card contacts a "twice mirrored image or back-to-back" relation exists. This means, the German card contact C1 corresponds to the French card contact C11, German card contact C2 corresponds to the French card contact C21, C3 corresponds to C61, C7 corresponds to C71, and C8 corresponds eventually to C81.

In accordance with the invention a flat cable 26 with only eight (i-p) wires is used. To make this possible a contact element connection 27 has to be provided so as to connect the wires i-p of the German card contacts with the French card contacts (their corresponding contact elements, respectively).

In accordance with the invention this contact element connection 27 is created simply by using a flat cable which leads from the German group of contact elements (contact group 29) to the French group 28 of contact elements (as is shown); or, the flat cable leads from the French group 28 of contact elements to the German group 29 of contact elements in such a manner that the wires of the flat cable 26 serve one contact element in the group of German contact elements and the corresponding contact element in the group of French group of contact elements.

In accordance with the invention the flat cable 26 coming from the row of contact elements C5 to C6 is folded over along a line 37 upwardly (or downwardly) and thereupon again but this time (at 38) downwardly (or upwardly), such that the flat cable 26 in the area of the French card contacts (or the corresponding insulation displacement means) extends just opposite to the extension in the area of the German card contacts. This is shown in FIG. 8 by the corresponding reference to wires i-p. Consider for instance wire m which is connected to the insulation displacement means I3 of the card contact C3. One recognizes that, in fact, the same wire m is connected with the insulation displacement means of the corresponding French card contact C31. This is true in a similar manner for all the other wires of the flat cable 26.

In FIG. 8 the folding of the flat cable 26 is shown beginning with the card contacts C5 to C8. The folding occurs initially in an upward direction (line 37) and thereupon in a downward (line 38) direction. As mentioned above, the folding may be carried out first downwardly and then upwardly.

Preferably, the flat cable 26 is adhesively bonded to itself in the area of the substantially triangular area of overlap which is formed. In this way a flat design is possible.

It should be noted that the representation of FIG. 8 shows that the flat cable 26 starts from the electronic processing means 25 and is initially contacted to the German group of contact elements and thereupon to the French group of contact elements. The flat cable ends after leaving the area of the French row of contact elements C51, C61, C71 and C81. It can be readily recognized that a reverse arrangement is possible, i.e., the flat cable could first be introduced into the French group 28 of contact elements and would then be folded in the manner pointed out above, whereupon the flat cable would enter the group 29 of German contact elements and the cable would end after the insulation displacement means which are assigned to the German card contacts C1–C4 are contacted or terminated.

Due to the arrangement provided by the invention contact elements of the same design as shown for contact elements 3, 6 can be used for all the card contacts, i.e., the French and the German contacts. This leads to a simple and cost efficient design.

It is also possible to realize the two principal or basic possibilities for connection or termination as shown in FIGS. 7 and 8 by cables other than a flat cable.

It is also conceivable to provide a connection of an eight-wire flat cable (26) only with one of the group of contact elements, for instance, with the German group of contact elements. The respective other group of contact elements, for instance, the French group of contact elements could then be connected with the German group of contact elements in a different manner, for instance by means of a printed circuit or a similar connecting means. Moreover, the corresponding contact elements of the French group of contact elements could be fixedly wired with the corresponding contact elements of the German group of contact elements such that only the connection of the German group (29) of contact elements with the electronic card processing means would be required.

It should further be noted that the contact portions (42) of the contact elements (3, 6) are provided in the form of contact springs, and that the contact springs (42) are arranged in accordance with the ISO standard for the German card contacts and in accordance with the CP8 card system for the French card contacts. Attention is drawn to the fact that the French as well as the German contact portions (42) are arranged with the same distance (pitch) corresponding to the appropriate card contacts. Inasmuch as in accordance with the invention the dual-contacting apparatus is designed such that only the one or the other card can be inserted, the housing (22) of the contacting apparatus (20) only comprises a single card insert opening.

In the above description, reference has been made to insulation displacement means. In practice, such means is in the form of insulation displacement contacts of conventional design which pierce and displace the insulation surrounding each conductor and electrically contact with such conductor.

What is claimed is:

1. A dual-contacting apparatus for contacting selectively the card contacts of a chip-card of a first type or the card contacts of a chip-card of a second type, said apparatus having a set of contact elements which comprises:
   insulating body means,
   a plurality of contact elements supported by said insulating body means, wherein said contact elements form a first group of contact elements which are adapted for contacting the contacts of said chip-card of said first type, and wherein further said contact elements form a second group of contact elements which serve for contacting the card contacts of said chip-card of said second type.
   means for connecting the contact elements with an electronic card processing means, wherein each contact element comprises a termination member adapted for connection with the card processing means and a contact member for contacting one of the card contacts, and
   means for coupling corresponding ones of the contact elements of the first and second groups, such that the connecting means is either connected only to the termination members of the contact elements of said first group or only to the termination members of the contact elements of said second group.

2. The apparatus of claim 1, characterized in that the contact elements of the set of contact elements comprise insulation displacement means which are contacted by a flat cable in a parallel manner.

3. The apparatus of claim 2, wherein said coupling means is in the form of a flat cable.

4. The apparatus of claim 1, characterized in that the termination members of the first group of card contact elements and of the second group of card contact elements are in the form of insulation displacement means and said connecting and coupling means is in the form of a flat cable.

5. The apparatus of claim 4, wherein said card contacts of said chip-card of said first type are arranged in a twice mirrored relationship with respect to the card contacts of said chip-card of said second type.

6. The apparatus of claim 4, wherein said flat cable is coupled with the insulation displacement means of the second contact element group as well as of the first contact element group in such a manner that the contact elements of said first and second groups which correspond to each other are connected and at the same time the connection of said contact elements with the electronic processing means is provided.

7. The apparatus of claim 6, characterized in that the contact members are designed as contact element springs, and the contact element springs are designed in accordance with different standards for the card contacts of said chip-cards of said first and second type.

8. The apparatus of claim 7, characterized in that the contact members of said first and second groups are arranged with the same pitch in accordance with the corresponding card contacts.

9. The apparatus of claim 4, characterized in that the set of contact elements is disposed within a housing of the contacting apparatus.

10. The apparatus of claim 9, characterized in that a card support is arranged in said housing for selectively receiving only a single card, of the first or of the second type, such that a card being located in a reading position either provides for contact of only the first or of only the second group of contact elements with either the group of card contacts of said chip-card of said first type or the group of card contacts of said chip-card of said second type.

11. The apparatus of claim 10, characterized in that said housing comprises a single card insert opening for the insertion of either the chip-card of said first type or second second type.

12. The apparatus of claim 11, characterized in that the flat cable extends from the insulation displacement means of the second group of contact elements and is then turned around to extend to the insulation displacement means of the first group of contact elements and thereupon extends from the first group of insulation displacement means to the card processing means, whereby the turn-around of the flat cable between the first and second groups of insulation displacement means is carried out by folding the flat cable.

13. The apparatus of claim 12, wherein the turn-around of the flat cable between the first and second groups of insulation displacement means is carried out by first folding the flat cable upwardly and inwardly and then downwardly and inwardly, or first folding the flat cable downwardly and inwardly, and then upwardly and inwardly.

14. The apparatus of claim 13, characterized in that the folding occurs twice by about 45 degrees.

15. The apparatus of claim 11, characterized in that the flat cable starts from the insulation displacement means of said first group of contact elements, is turned around and extends to said second group of contact elements, and then extends from the group of contact elements to the card processing means, whereby said turn-over of the flat cable between the first and second group of insulation displacement means is achieved by folding the flat cable.

16. The apparatus of claim 15, wherein said turn-over is carried out by folding said flat cable first upwardly and inwardly and then downwardly and inwardly, or first downwardly and inwardly and then upwardly and inwardly.

17. The apparatus of claim 16, characterized in that the folding occurs twice by about 45 degrees.

18. The apparatus of claim 15, characterized in that the folding is carried out in such a manner that the outermost wire of the flat cable in the area of the insulation displacement means of said contact elements of said first group also forms the outermost wire in the insulation displacement means of said contact elements of said second group, while the innermost wire in the area of the insulation displacement means of said first group also forms the innermost wire in the area of the insulation displacement means of said second group.

19. The apparatus of claim 18, characterized in that the flat cable is adhesively bonded to itself in the area of overlap which is formed by said folding operation.

20. A contacting apparatus for chip-cards having a first predetermined arrangement of card contacts, said contacting apparatus comprising a set of contact elements, said set of contact elements comprising a first group of contact elements adapted to be resiliently pressed against said card contacts, said contacting apparatus further comprising a flat cable connected with said contact elements of said first group, characterized in that for the purpose of contacting a chip card having a second arrangement of card contacts which are arranged in a twice mirrored manner with respect to the contacts of said first chip-card, a second group of correspondingly arranged contact elements is provided in said set of contacts, said second group of contact elements being connected with the corresponding contact elements of said first group by means of a flat cable which is folded over twice.

21. A set of contact elements for a dual-contacting apparatus for contacting selectively the card contacts of a chip-card of a first type or for contacting the card contacts of a chip-card of a second type, said set of contact elements comprising:
insulating body means,
a plurality of contact elements supported in said insulating body means, wherein the contact elements form a first group of contact elements adapted for contacting the card contacts of said chip-card of the first type, and wherein the contact elements form a second group of contact elements adapted for contact the card contacts of said chip-card of the second type,
means for connecting the contact elements with an electronic card processing means, wherein each contact element comprises a termination member for connection with the card processing means and a contact member for contacting a card contact, and
means for coupling appropriate contact elements of said first and second groups in such a manner that the connecting means is either connected only with the termination members of the contact elements of said first group or is connected only at the termination members of the contact elements of said second group.

* * * * *